United States Patent [19]
Hippenmeyer et al.

[11] Patent Number: 6,016,961
[45] Date of Patent: Jan. 25, 2000

[54] OPTICAL CODE READER WITH AN OPTICAL SCANNING DEVICE

[75] Inventors: Heinrich Hippenmeyer, Freiamt; Hans-Werner Pierenkemper; Jürgen Reichenbach, both of Emmendingen, all of Germany

[73] Assignee: Sick AG, Waldkirch, Germany

[21] Appl. No.: 09/003,302

[22] Filed: Jan. 6, 1998

[30] Foreign Application Priority Data

Jan. 7, 1997 [DE] Germany ............................ 197 00 281

[51] Int. Cl.⁷ ................................................. G06K 7/10
[52] U.S. Cl. ................................ 235/462.2; 235/462.08; 235/462.23
[58] Field of Search .................... 235/462.06, 462.08, 235/462.2, 462.22, 462.23, 462.24, 462.21

[56] References Cited

U.S. PATENT DOCUMENTS

| | | | |
|---|---|---|---|
| 4,920,255 | 4/1990 | Gabeler | 235/462.21 X |
| 5,280,162 | 1/1994 | Marwin | 235/462 |
| 5,420,411 | 5/1995 | Salatto, Jr. et al. | 235/462 |
| 5,504,319 | 4/1996 | Li et al. | 235/462 |

FOREIGN PATENT DOCUMENTS

| | | |
|---|---|---|
| 0574017 A2 | 12/1993 | European Pat. Off. . |
| 3121070 A1 | 3/1982 | Germany . |
| 3423720 A1 | 1/1985 | Germany . |
| 3936126 A1 | 5/1990 | Germany . |
| 3421079 C2 | 3/1991 | Germany . |
| 3336961 C2 | 7/1991 | Germany . |
| 4219560 A1 | 12/1992 | Germany . |
| 4322803 A1 | 1/1995 | Germany . |
| 4336137 A1 | 4/1995 | Germany . |

*Primary Examiner*—Karl D. Frech
*Attorney, Agent, or Firm*—Townsend and Townsend and Crew LLP

[57] ABSTRACT

The invention relates to an optical code reader comprising an optical scanning device (11) having a light transmitter (27) and a photoreceiver arrangement (19), said scanning device (11) transmitting a light beam (12) executing a scanning movement into a reading zone (14) provided at a reading distance ((L) from the scanning device (11). The reading zone preferably has a substantially planar front surface (13) and, moreover, a predetermined depth. Articles (16) carrying an optically detectable article code (15) are moved through the reading zone (14) and an electronic evaluation system (17), which is provided at the output of the scanning device (11), evaluates electrical signals formed by the photoreceiver arrangement (19) from the light reflected from the code (15) to the scanning device (11) and identifies the article code (15). A reflector (18) is arranged behind the reading zone (14) and, in the absence of an article (16) in the reading zone (14), reflects light received from the scanning device (11) in a manner identifiable as coming from the reflector (18) back to the scanning device (11). An article recognition stage (21) is provided in the electronic evaluation system (17), which suppresses the article identification until no further light is received which can be identified as coming from the reflector (18).

11 Claims, 1 Drawing Sheet

OPTICAL CODE READER WITH AN OPTICAL SCANNING DEVICE

BACKGROUND OF THE INVENTION

The invention relates to an optical code reader comprising an optical scanning device having a light transmitter and a photoreceiver arrangement, said scanning device transmitting a light beam executing a scanning movement into a reading zone provided at a reading distance from the scanning device, with the reading zone preferably having a substantially planar front surface and, moreover, a predetermined depth, wherein articles carrying an optically detectable article code are moved through the reading zone, and an electronic evaluation system is provided at the output of the scanning device, evaluates electrical signals formed by the photoreceiver arrangement from the light reflected from the code to the scanning device and identifies the article code.

DESCRIPTION OF PRIOR ART

The scanning device can, for example, be formed in accordance with German patent DE-PS 23 40 688 as a parallel scanner, or, for example, in accordance with German patent 36 00 578 as a V-scanner. The light reception preferably takes place in each case by autocollimation.

Known code readers are normally brought into the active state by means of an external trigger signal, the so-called reading window signal, in which the scanning device attempts to identify a code arranged on the articles located in the reading zone. If successful, the code reader transmits the information to the higher order system, otherwise the system receives a fault indication.

Furthermore, it is already known to allow the scanning device to operate continuously without a particular control from the outside, with an identification signal being transmitted as soon as a bar code enters into the reading zone. Here a lack of ambiguity with respect to the presence of an object only exists with a valid identification. A statement concerning the presence of an article in the reading zone does not take place if -he information cannot be read. Non-recognition of a code information can be attributable to the code not being present or to a code which is present being defective.

SUMMARY OF THE INVENTION

The object of the present invention is to provide an optical code reader of the initially named kind, which also recognizes the presence of articles in the reading zone which do not have a code identifiable by the electronic evaluation system.

In order to satisfy this object there are provided optical scanning devices which are characterized in that a light reflecting means is arranged behind the reading zone, which, in the absence of an article in the reading zone, reflects light received from the scanning device in a manner identifiable as coming from the light receiving means back to the scanning device; and in that an article recognition stage is provided in the electronic evaluation system, which suppresses the article identification until no further light is received which can be identified as coming from the light receiving means.

A particularly advantageous practical embodiment of the invention is characterized in that the light receiving means is formed as a reflector and is also aligned with respect to the scanning device in such a way that, in the absence of an article in the reading zone, the photoreceiver arrangement in the scanning device receives a quantity of light which is measurable, and preferably at least one order of magnitude larger than the quantity of light directed from the article to the receiving arrangement in the presence of an article in the reading zone, and which is evaluated in the article recognition stage.

The quantity of light passing tom the reflector to the receiver arrangement is preferably greater by a factor 10 to 100 than the quantity of light passing from the article to the receiver arrangement.

It is particularly expedient if the light receiving means is provided with a special identification code, which can be evaluated in the article recognition stage.

Thus, while dispensing with external control devices for the Code reader, the invention not only delivers to the higher order system the corresponding information on successful identification of an article code but also, with a non-successful code reading, makes the information associated with this situation available to the host. That is to say, the presence of an article in the reading zone, which has no code at all or a defective code, is also recognized. The code reader of the invention thus has the ability to recognize the presence of an article independently of a code identification and to confirm this presence.

It is preferred when the light receiving means is provided with two identification codes which are arranged displaced relative to one another, essentially in the direction of movement of the articles. Such identification codes should be capable of being detected by the scanning device and evaluated in the article recognition stage and should thus be suitable for the recognition of the direction of movement of the articles. The scanning device must in this respect be designed in such a way that it can sense and recognize two codes lying alongside one another in the direction of movement of the articles. When an article is moved into the region of the two identification codes, first one identification code and then both identification codes are covered over by the article. When the two identification codes are different from one another, a determination can be made as to which of the two identification codes is first covered, from which a conclusion can then be drawn on the direction of movement of the respective article. The article is in this respect always coming from the side on which the first covered identification code lies.

The invention also relates to a method of operating an optical code reader comprising an optical scanning device having a light transmitter and a photoreceiver arrangement, said scanning device transmitting a light beam executing a scanning movement into a reading zone provided at a reading distance from the scanning device, with the reading zone preferably having a substantially planar front surface and, moreover, a predetermined depth, wherein articles carrying an optically detectable article code are moved through the reading zone, and an electronic evaluation system is provided at the output of the scanning device, evaluates electrical signals formed by the photoreceiver arrangement from the light reflected from the code to the scanning device and identifies the article code, characterized in that a light reflecting means is arranged behind the reading zone which, in the absence of an article in the reading zone, reflects light received from the scanning device in a manner identifiable as coming from the light receiving means back to the scanning device; and in that an article recognition stage is provided in the electronic evaluation system, which suppresses the article identification until no light which can be identified as coming from the light receiving means is any longer received, which is evaluated as an article recognition and triggers the article identification. Thus an important aspect of the method lies in the fact that the scanning device provided for the code reading is also able to recognize a light receiving means arranged behind the reading zone, provided it is not covered over by an article.

The code reader of the invention and the method of the invention are directed to the use of the components necessary for the operation of the higher order system. A reflector is presented to the code reader in its field of view bounded by the scanning angle or aperture angle, but outside of its maximum reading distance for customary, standard bar codes around the application specific object length, with the presence of the reflector being periodically checked. When formed as a reflector as described above, the light receiving means delivers to the scanning device an identity signal which lies orders of magnitude (up to a factor of 100) above the received powers which can be achieved with standard bar codes and thus offers a reliable plausibility criterion. Furthermore, in one embodiment of the light receiving means it can be provided with a special bar code, the identification of which permits the operating mode to be extremely reliable in all environmental conditions. As long as the light receiving means is detected by the code reader, no order is given for article identification. When an article to be identified enters into the range of view of the code reader, the light receiving means is covered over by the article and can thus no longer be detected. In this way a reading window is generated and the identification procedure is triggered, which can in turn be concluded either with a successful reading or with a non-reading.

The modules of the code reader, which are in any case present, are also used for the mode of recognizing the light receiving means. The code reader is switched on and off cyclically in accordance with the applicable boundary conditions. Thereafter, an intensity measurement first takes place, and/or a decoding procedure for the special bar code of the light receiving means. In this way the availability for the code reader is improved in comparison to the free running reading operation because of the shorter operating times of the laser diode. The sift condition, which is modified with respect to the large signal strength in comparison to the standard scanning device, is exploited for the identification and identification decoding of the light coming from the light receiving means. The interface to the bar code decoder is identical for the reading of the bar code and for the mode of recognizing the light reflecting means. The bar code discrimination, i.e. the ability to distinguish between different types of code, is a standard feature and does not place any additional requirements on the scanning device for the method of the invention. The system control of the code reader reacts to the shading of the light reflecting means, and the thus lacking recognition of the light reflecting means, by adopting the state "reading window active", and passes this on to the higher order system, which now in turn expects the information resulting from the article identification process. With the renewed recognition of the light reflecting means, the state "reading window inactive" is adopted and the next article is awaited.

In contrast to the previously known solutions, which operate with a free ruling reading operation, a statement concerning the presence of objects without a bar code or with a non-readable bar code can be passed on using the method of the invention or the code reader of the invention. This information would otherwise have to be provided by an additional sensor system.

BRIEF DESCRIPTION OF THE DRAWING

The invention will be described in the following by way of example and with reference to the drawing.

DESCRIPTION OF THE PREFERRED EMBODIMENTS

Figure 1:
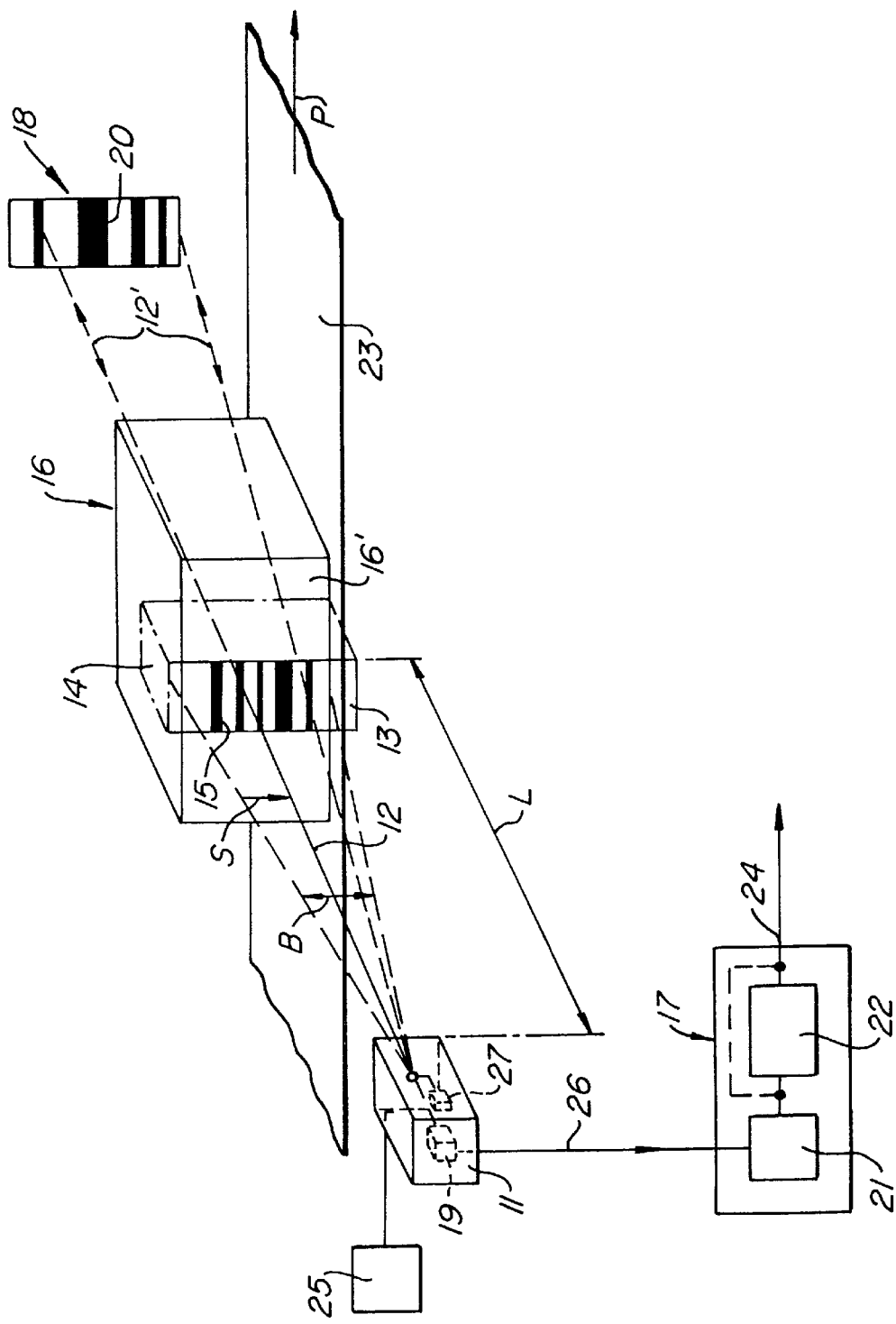
FIG. 1 a schematic perspective view of an optical code reader in accordance with the invention comprising a block circuit diagram type representation of the electronic evaluation circuit.

In accordance with FIG. 1 an article 16 arranged on the conveyor belt 23 is moved in the direction of the arrow P past an optical scanning device 11. The optical scanning device 11 executes a cyclical scanning movement in an angular range B and directs a light beam, produced by a light transmitter 27 and, for example, a non-illustrated mirror wheel, to a substantially rectangular block-shaped reading zone 14 present above the conveyor belt 23. The reading zone 14 has a front surface 13 extending perpendicular to the central light beam 12 and is in turn perpendicular to the surface of the conveyor belt 23. The central scanning light beam 12 of the scanning device 11 should also stand at least substantially perpendicular to the direction of movement P of the conveyor belt.

A stripe or bar code 15 is provided on the surface 16' of the article 16 facing the scanning device 11, with the bars extending at least substantially perpendicular to the scanning direction S of the light beam 12.

A reflector 18, which is preferably formed an a retro-reflector, is located, when seen from the scanning device 11, behind the reading zone 14 and preferably also behind the conveyor belt 23. The reflector has a special reflector bar code 20 and is arranged relative to the scanning device 11 in such a way that when an article 16 is not present in the reading zone 14, the scanning light beams reach the reflector 18, which is indicated in FIG. 1 at 12'. The reflecting surface of the reflector 18 is so designed and arranged that the incident light is at least largely reflected back to the scanning device 11.

Two bar codes which differ from one another can be provided spaced apart from one another in the horizontal direction. The sensing of these bar codes permits one to determine the direction of movement of the article 16.

A photoreceiver arrangement 19 is also provided inside the scanning device 11, in addition to the non-illustrated light source 27 and the customary scanning means, and either receives light reflected by the article 16 or by the reflector 18 and transmits a corresponding electrical signal to the electronic evaluation circuit 17, which has an article recognition stage 21 and an article identification stage 22. A signal appears at the output 24 of the electronic evaluation circuit 17 and indicates to a non-illustrated, higher order system not only the recognition and the content of a detected article code 15, but in addition also transmits an indication of whether an article 16 is present in the reading zone 14 or not.

The manner of operation of the described code reader is as follows:

The scanning device 11 is always cyclically switched on by an application oriented switching device 25, when the movement of an article 16 through the reading zone 14 is expected for the relevant application.

If an article 16 is not present in the reading zone 14 on switching on, then a light beam 12' which executes a V-shaped scanning movement strikes the reflector 18, which reflects a part of the light back to the scanning device 11, where the photoreceiver arrangement 19 generates an electrical signal corresponding to the quantity of light received. This is first transmitted via a signal line 26 to the article recognition stage 21 within the electronic evaluation circuit 17.

Since, in accordance with a first embodiment, the light received from the reflector 18 is more intense by at least one order of magnitude than the light originating from an article code 15, the article recognition stage 21 recognizes from the high intensity that no article 16 is present in the reading zone 14. A signal then appears at the output 24, which is representative for the non-presence of an article 16 in the reading zone 14.

A similar light output signal is achieved when a special reflector code 20 is arranged on the reflector 18 and is recognized as such by the article recognition stage 21.

As soon as an article 16 enters into the reading zone 14 and at least substantially fills out the latter, the reflector 18 is covered over relative to the scanning device 11, and now a substantially smaller quantity of light falls onto the photoreceiver arrangement 19. Thereafter, the article recognition stage 21 recognizes that an article 16 is now located inside the reading zone 14. In this way a reading window is opened in the following article identification stage 22 so that on the entry of an article code 15 into the reading zone 14 the latter can be identified, provided it is in a problem-free condition or state.

Thus, a signal representative for the mere presence of an article 16 in the reading zone 14 first appears at the output 24. If then an article code 15 is identified, an article identification signal is additionally delivered from the output 24 to the higher order or supervisory system.

Insofar as a discrimination takes place between the presence and non-presence of an article 16 by the quantity of light reflected back from the reflector 18, it is important that the front surface 16' of the article 16 facing the scanning device 11 does not itself have a reflective capability which is too great. Should the articles 16 be articles having strongly reflecting surfaces, then the special reflector recognition code 20 is applied to the reflector 18, whereby the system becomes independent of the quantity of light reflected by the article 16 or by the reflector 18.

REFERENCE NUMERAL LIST

11 scanning device
12 light beam
13 front surface
14 reading zone
15 article code
16 article
16' surface
17 electronic evaluation system
18 reflector
19 photoreceiver arrangement
20 reflector code
21 article recognition stage
22 article identification stage
23 conveyor belt
24 output
25 switching device
26 signal line
27 light transmitter
L reading distance
P direction of movement of the conveyor belt
B scanning zone
S direction of scanning

What is claimed is:

1. Optical code reader comprising an optical scanning device having one light transmitter and one photoreceiver arrangement, said scanning device transmitting one light beam executing a scanning movement into a reading zone provided at a reading distance from the scanning device, the reading zone having a substantially planar front surface and a predetermined depth, wherein articles carrying an optically detectable article code are moved through the reading zone, an electronic evaluation system receiving an output of the scanning device which evaluates electrical signals generated by the photoreceiver arrangement from light reflected by the code to the scanning device and identifies the article code, and a light reflector arranged behind the reading zone which, in the absence of an article in the reading zone, reflects light received from the scanning device in a manner identifiable as coming from the light reflector back to the scanning device, the electronic evaluation system including an article recognition stage which suppresses the identification of an article until no further light is received which can be identified as coming from the light reflector.

2. Code reader in accordance with claim 1 wherein the light reflector is aligned with respect to the scanning device in such a way that, in the absence of an article in the reading zone, the photoreceiver arrangement in the scanning device receives a quantity of light which is at least one order of magnitude larger than the quantity of light directed from the article to the receiving arrangement when an article is present in the reading zone, and which is evaluated in the article recognition stage.

3. Code reader in accordance with claim 1 wherein a quantity of light passing from the reflector to the receiver arrangement is greater by a factor of 10 to 100 than the quantity of light passing from the article to the receiver arrangement.

4. Code reader in accordance with claim 1 wherein the light reflector includes a special identification code which can be evaluated by the article recognition stage.

5. Code reader in accordance with claim 4 wherein the light reflector includes two identification codes which are arranged substantially displaced relative to one another in a direction of movement of the articles, the two identification codes being detectable by the scanning device and evaluatable in the article recognition stage for recognizing the direction of movement of the articles.

6. Code reader in accordance with claim 1 including an article identification stage and wherein, when light identifiable as coming from the light reflector is not received, the article recognition stage generates a reading window which causes the article identification stage to check whether an article code is present or not, so that an article identification takes place when an article code is present in the reading zone.

7. Code reader in accordance with claim 1 wherein the scanning device is cyclically switched on and off in accordance with preset boundary conditions applicable to the particular application.

8. Code reader in accordance with claim 1 wherein the light reflector is a retro-reflector.

9. Code reader in accordance with claim 1 wherein the code is a bar code.

10. Method of operating an optical code reader comprising providing an optical scanning device having a light transmitter and a photoreceiver arrangement, with the scanning device transmitting a single light beam and executing a scanning movement into a reading zone at a reading distance from the scanning device, moving articles carrying an optically detectable article code through the reading zone, evaluating electrical signals generated by the photoreceiver arrangement from light reflected by the code, arranging a light reflector behind the reading zone which, in the absence of an article in the reading zone, reflects light received from the scanning device in a manner identifiable as coming from the light reflector back to the scanning device, suppressing the article identification until no light which can be identified as coming from the light reflector is any longer received, evaluating the absence of light received from the light reflector as an article recognition, and thereupon triggering the article identification.

11. Optical code reader comprising an optical scanning device having a light transmitter and a photoreceiver arrangement, said scanning device transmitting a light beam executing a scanning movement into a reading zone provided at a reading distance from the scanning device, wherein articles carrying an optically detectable article code are moved through the reading zone, an electronic evaluation system receiving an output of the scanning device which evaluates electrical signals generated by the photoreceiver arrangement from light reflected by the code to the scanning device and identifies the article code, and a light reflector arranged behind the reading zone and including a special identification code which, in the absence of an article in the reading zone, reflects light received from the scanning device and identifies the reflected light as coming from the special identification code back to the scanning device, the electronic evaluation system including an article recognition stage which suppresses the identification of an article until no further light is received which can be identified as coming from the special identification code.

* * * * *